Jan. 12, 1971  F. I. V. WALKER  3,554,024
BRAKING FORCE TRAILER

Filed June 24, 1968  3 Sheets-Sheet 2

Inventor
Francis Ian Victor Walker
BY Watson, Cole, Grindle & Watson
Attorneys

Jan. 12, 1971  F. I. V. WALKER  3,554,024
BRAKING FORCE TRAILER
Filed June 24, 1968  3 Sheets-Sheet 3
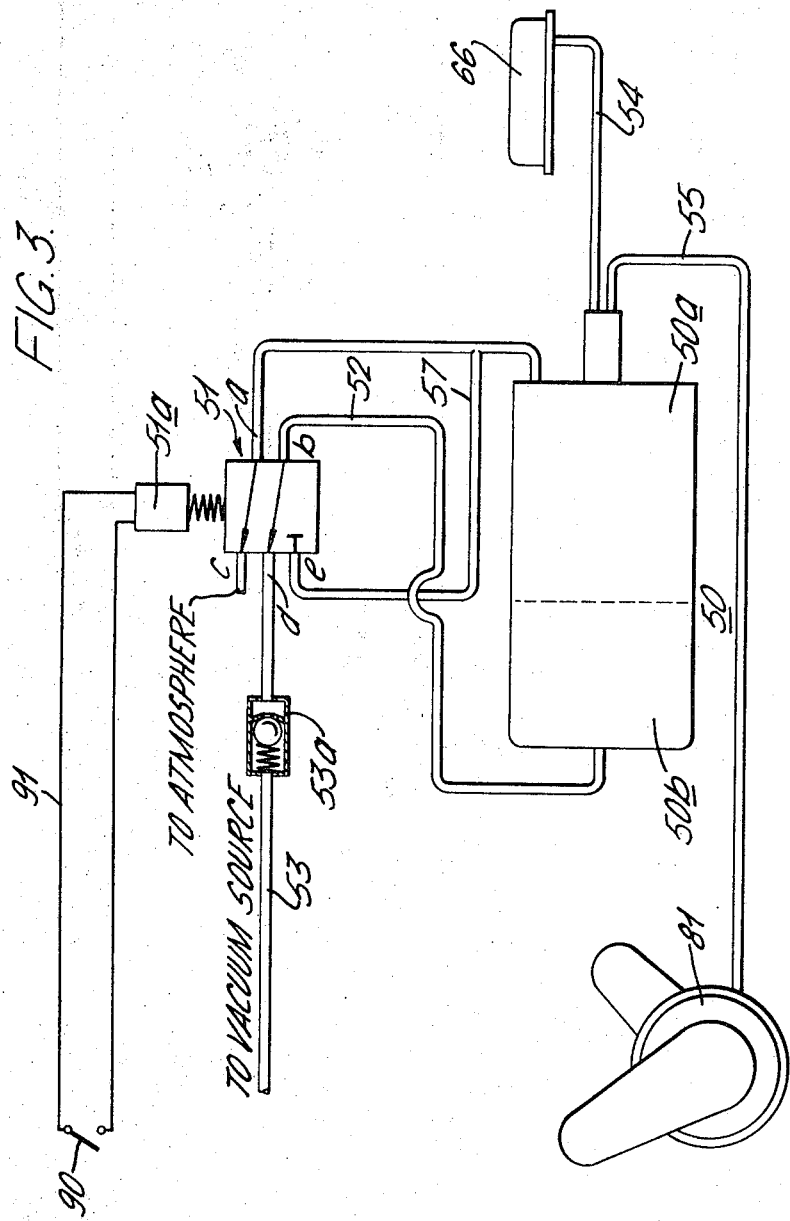

3,554,024
BRAKING FORCE TRAILER
Francis Ian Victor Walker, West Chiltington, Sussex, England, assignor to F. G. Miles Engineering Limited, Shoreham-by-Sea, Sussex, England
Filed June 24, 1968, Ser. No. 739,263
Int. Cl. G01l 5/28
U.S. Cl. 73—121                                         9 Claims

ABSTRACT OF THE DISCLOSURE

A braking force trailer for measuring the effectiveness of braking between a tire and the surface on which the tire runs has a test wheel on which the test tire is mounted. The test wheel is mounted at one end of an arm the other end of which is pivotally mounted to allow the arm to swing in a vertical plane relative to the rest of the trailer. The test wheel is equipped with a brake so that upon applying the brake the force generated between the test wheel tire and the running surface causes the supporting arm to swing backwards relative to the remainder of the trailer. A load cell is mounted between the supporting arm and the fixed part of the trailer to measure the force generated upon braking.

---

The present invention relates to apparatus for measuring the braking force or drag between a wheel and the surface on which the wheel is running.

In braking a wheel running on a surface, for example an automobile on a road or an aircraft on a runway, the effectiveness of braking depends on the interaction between the tire on the wheel and the running surface. By making braking tests with a given tire or on a given running surface, the relative braking effectiveness of different surfaces or tires under varying conditions, respectively, can be measured and the effectiveness of particular combinations of selected tire materials and constructions with selected running surfaces can likewise be evaluated. Among the other factors to be taken into account in measuring braking effectiveness are the wetness or otherwise of the running surface and the speed of the test wheel thereover.

The present invention is particularly concerned with apparatus for measuring the braking forces of an aircraft wheel on a runway but the apparatus hereinafter described has general application to braking measurements such as described in the preceding paragraph.

There has already been produced a braking force trailer for making measurements of the kind already mentioned and this trailer together with an evaluation of the results obtained is described in an article by C. G. Giles and F. T. W. Lander in "Journal of the Royal Aeronautical Society," February 1956 at pages 83 to 94. This article is incorporated herein by reference.

In the trailer described in the above-mentioned article a test wheel is mounted for rotation about a fixed axis in a trailer which is towed behind a vehicle such as an automobile. The test wheel is equipped with a brake controllable from the vehicle and a torque arm which is locked with the wheel and brake when the latter is applied and which acts on a pressure capsule to provide a measurement of the torque on the wheel due to the interaction between the running surface and the tire on the test wheel.

Experiments carried out with a trailer based on that described in the above article indicated the torque measurement obtained was limited in application. In consequence efforts have been made to find an improved arrangement for mounting the test wheel and measuring the reaction between the running surface and the tire of the test wheel not only when the wheel is locked by braking but under conditions of partial braking or even no braking.

According to the present invention there is now provided apparatus for measuring the reaction between a wheel and the surface on which the wheel is running, the apparatus comprising a body portion, means mounting a test wheel to said body portion, and means responsive to the force between the running surface and the test wheel to provide a signal indicative of such force, said mounting means comprising an arm on which said test wheel is rotatably mounted, said arm being pivotally mounted to said body portion to allow the arm to swing relative thereto in a direction opposite to that of the motion of said body portion, and said force responsive means comprising a device supported between said arm and said body portion and responsive to the displacement of said arm relative to said body portion due to the reaction between said test wheel and the running surface.

In order that the invention and the manner of putting it into practice may be better understood, an embodiment of the invention will now be described by way of example with reference to the accompanying drawings in which:

FIG. 3 is a diagram of the braking circuit.

Figure 1:
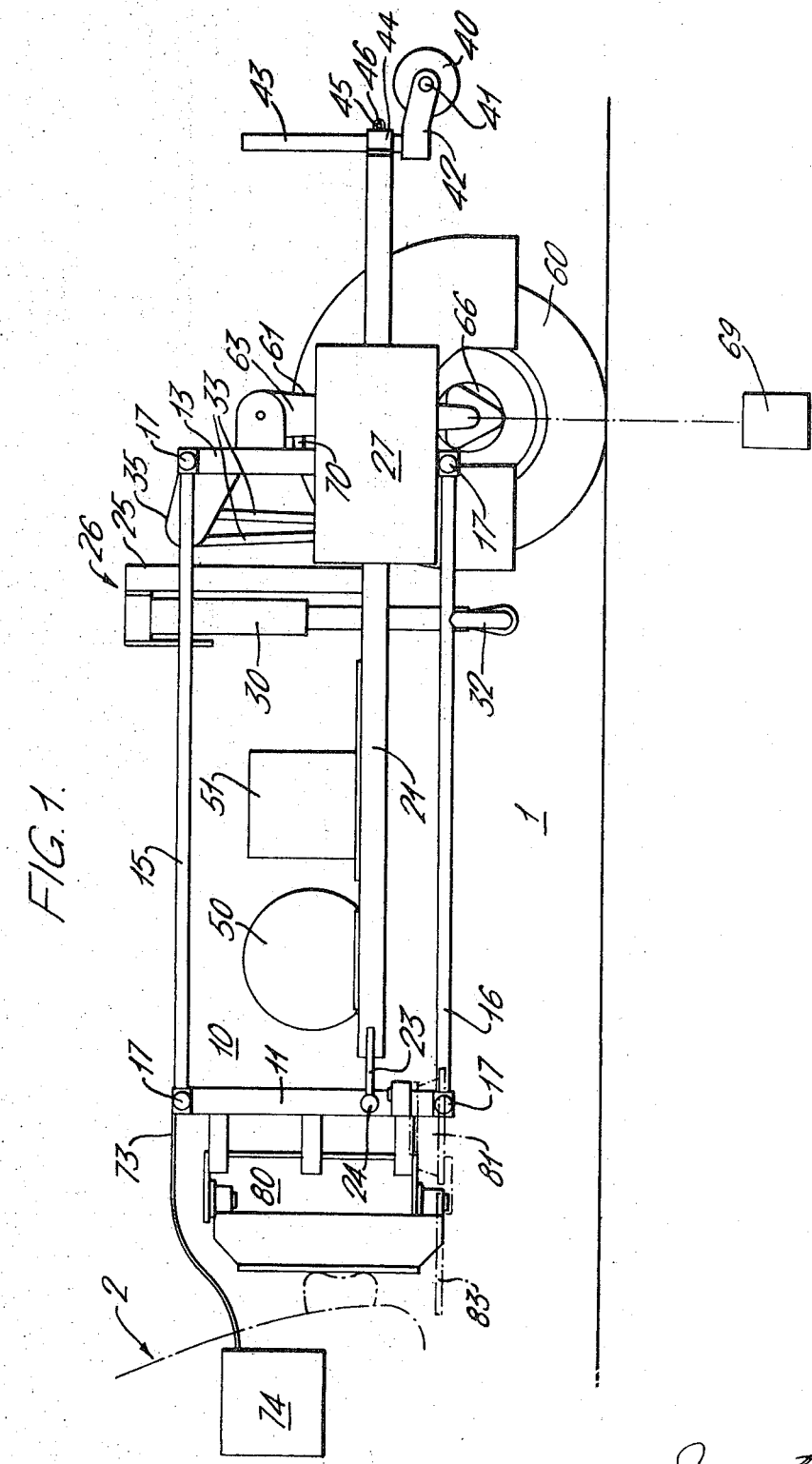
FIG. 1 shows in simplified schematic form a side elevation of a braking force trailer embodying the invention.
Figure 2:
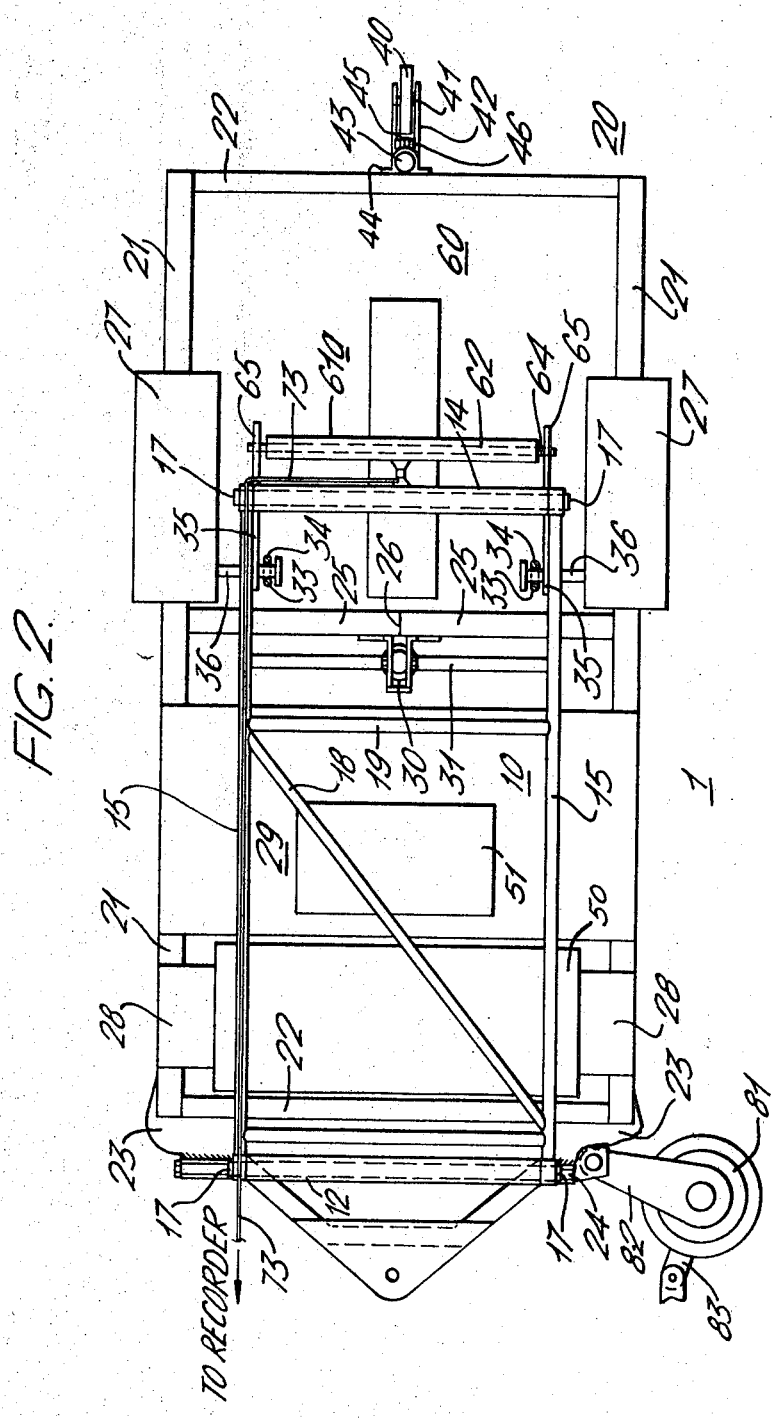
FIG. 2 shows in simplified schematic form a plan view of the trailer.

Referring to FIGS. 1 and 2 of the drawings, there is shown a trailer 1 attached behind a towing vehicle 2 the rear of which is shown in dot-dash outline. In order to show the main elements of the trailer clearly the figures have been simplified, it being believed that minor constructional details will be well within the purview of a skilled mechanical engineer.

The trailer 1 has a rectangular box-shaped body portion 10 comprising a framework of steel members. This box-shaped structure has a front frame assembly comprising a pair of parallel upright channel members 11 (one of which is shown in FIG. 1) and a pair of cross members 12 of channel form (one of which is shown in FIG. 2) joining the upper and lower ends of the uprights 11. There is also a similar gear frame assembly comprising a pair of parallel upright channel members 13 joined top and bottom by a pair of cross-members 14 of channel form. One of the uprights 13 can be seen in FIG. 1 and one of the cross-members 14 in FIG. 2. The joints can be made by welding or in any other suitable way.

The front and rear frame assemblies are linked by four tubular members extending longitudinally of the trailer. These link members comprise an upper pair 15 and a lower pair 16 only one of which lower pair can be seen in FIG. 1. The ends of the tubular link members are secured to the front and rear frame assemblies at the corners thereof by bolts 17 in such manner as to allow some pivotal vertical movement of the link members relative to the front and rear frame assemblies. The upper pair 15 of link members are cross-braced by tubular pieces 18 and 19 and a corresponding bracing is provided on the lower pair 16 of link members.

Carried by the box-like frame structure just described is a rectangular load frame 20 comprising two channel members 21 extending longitudinally of the trailer outside of the box-like structure and two cross-channel members 22 securely fastened to the members 21. At the front corners of the load frame 20 extension pieces 23 are mounted as by welding, these extension pieces having horizontal holes therethrough to receive bolts 24 by which the load frame is pivotally mounted to the uprights 11.

The load frame 20 also carries two inwardly and upwardly extending supports 25 which meet at an apex 26 at which is supported one end of a shock absorber 30. The other end of the shock absorber 30 is fastened to a bar 31 carried beneath the box frame and secured thereto by welded extensions 32.

As well as the shock absorbing coupling between the box frame 10 and the load frame 20 provided by shock absorber 30, a further coupling is provided by rubber cord springs 33. The cord springs 33 are suspended from horizontal hubs 34 mounted on plates 35 welded to the uprights 13 of the rear frame assembly. The lower ends of cord springs 33 are attached to respective inward extensions 36 mounted on the longitudinal members 21.

The load frame 20 also carries weights 27 mounted on the longitudinal members 21, the weights being evenly distributed on each member. The weights can be conveniently made of a number of units each apertured to fit on the member 21.

On the rear cross-piece 22 of the load frame a small castor wheel 40 is mounted. The wheel 40 is rotatably mounted on an axle 41 supported in a plate 42 welded to the bottom of tubular member 43. The member 43 is supported in a split U-clamp 44 fastened to the rear cross-piece 22 and the clamp 44 has a pair of lugs 45 through which is received a nut and bolt 46 for holding the member 43 in the clamp 44 at any desired vertical position. By lowering the member 43, the trailer 1 can be supported on the wheel 40 while the trailer is maneuvered rather than on the test wheel described below.

Also carried by the load frame 20 is a vacuum servo with integral tank 50 together with a solenoid valve 51. The vacuum servo and soelnoid valve are parts of the braking system to be described below and are mounted on plates 28 and 29 bolted to the inner surfaces of longitudinal members 21.

The trailer thus far described mounts and runs on a test wheel 60 which is carried by a bifurcated arm 61 in conventional manner. The upper portion of the arm 61 comprises a thick plate-like portion 61a extending nearly across the width of the box-like structure 10. The upper end of the arm is turned over at 62 and forms a rigid shallow tray-like structure with side pieces 63. The side pieces are apertured to receive a horizontal rod 64 the ends of which are supported on extensions 65 projecting from the uprights 13 and welded thereto. The wheel 60 is thus free to swing in a vertical plane relative to the body of the trailer. The arm 61 with the wheel 60 swing in a direction opposite to the direction of the motion of the trailer, that is to say, in the embodiment shown, the arm 61 swings rearwardly of the trailer.

The test wheel 60 is conventional and provided with a drum brake 66 controllable from the towing vehicle as will be made clear from the description of the braking circuit given below.

In order to measure the braking force or drag on the test wheel when it is braked a load cell 70 is supported, midway between the uprights 13, between the arm 61 and a bracket (not shown) secured to the rear frame assembly of the trailer. The load cell can be of any of the well known kinds of such devices and is preferably in the form of a strain gauge providing an electrical output signal when the gauge is under tension. When the test wheel 60 is braked or when drag is otherwise applied thereto, the force on the wheel causes the arm 61 to be pivotally displaced rearwardly about the rod 64. This displacement is resisted and, in fact, is substantially prevented by the strain gauge and the electrical signal generated thereby as a result of the tension therein is taken through a cable 73 to a chart recorder 74 mounted in the towing vehicle.

The towing vehicle 2 is coupled to the front frame assembly of the trailer 1 by any conventional towing linkage 80. In order to prevent the trailer 1 from swinging from side to side while being braked a further drum brake arrangement 81 has an arm 82 fastened to the upright 11 of the front frame assembly and a second arm 83 fastened to a convenient point on the towing vehicle. The brake 81 is operated simultaneously with brake 66 to prevent relative angular movement of arms 82 and 83 and thus prevent the trailer 1 from swinging about the towing mechanism relative to the towing vehicle 2.

The layout of the braking system is shown in FIG. 3. The system is controlled by a brake switch 90 mounted in the towing vehicle and which is connected by an appropriate cable 91 in the energisation circuit of the solenoid 51a of the solenoid valve 51 already referred to. The valve 51 has five ports designated a to e of which ports a and b communicate with ports c and d, respectively, in the unenergised state of the valve and with ports d and e when the valve is energised. Thus, in the position shown with switch 90 open the vacuum servo 50a is free to atmosphere via ports a and c while the vacuum tank 50b is evacuated from a source such as the induction manifold of the towing vehicle engine through a pipe 52 connected to port b, port d, and a pipe 53 leading from port d which pipe includes a non-return valve. The test wheel brake 66 and anti-jack-knife brake 81 coupled to the servo 50a by pipes 54 and 55 are not operated.

Upon closing switch 90, valve 51 is energised and the vacuum servo 50a connected to tank 50b through pipes 52 and 57 connected to valve ports b and e. The brakes 66 and 81 are thereby operated.

For the way in which the braking force trailer is used to take measurements and the manner in which such measurements are evaluated, reference should be had to the Giles and Lander article previously mentioned. It is to be noted that the above-described trailer does not require the test wheel to be completely locked though, of course, measurements can be taken under these conditions. Drag measurements can also be made with the brake 66 partially applied if desired, or without the brake applied to measure drag in slush, grass or similar environments.

In a practical embodiment of the trailer, the weights 27 carried by the load frame 20 were each of some 125 lbs.; the rubber cord springs had a rate of about 80 lbs./in., and the shock absorber 30 which was hydraulic had a bump rate of 4 lbs./in./sec. and a rebound rate of 8 lbs./in./sec. The test wheel was fitted with a 16 x 4 in. tire. This combination of load and springing has been found to give a smooth load on the test wheel when the latter is braked.

In order to obtain an accurate record of the speed of the test wheel 60 when the above described measurements are being made, it is preferred to mount a tachometer 69 shown in FIG. 1 to obtain a signal indicative of the speed of rotation of the test wheel. The tachometer is coupled by a cable (not shown) to monitoring apparatus in the towing vehicle.

In order to avoid placing compressive forces on the strain gauge 70 when the trailer is being moved around, it is preferred to have a rigid link which may be detachably mounted as by nuts and bolts between the suspension arm 61 and the rear frame assembly of the trailer to prevent movement of the arm under such circumstances. Furthermore, the clockwise displacement position of the arm 61 can be limited by a rubber stop or buffer secured to the frame at a position preventing the strain gauge 70 being compressed.

It will be readily apparent that the actual layout of the trailer and the manner in which the parts are mounted can be varied from what has been specifically described. The load cell 70 can as already indicated take various forms. For example, the cell may be a hydraulic pressure capsule having one end of a capillary tube connected to the cylinder thereof, the other end of the tube being connected to a Bourdon tube from which a pressure signal is derived for the chart recorder 74. Alternatively, a restraining spring and an extensometer could be used in place of the load cell.

In describing the manner in which the trailer 1 is coupled to the tow vehicle 2, reference was made to a drum brake arrangement 81 acting between the trailer and the tow vehicle to prevent jack-knifing of the trailer.

This feature is of particular importance when tests are being carried out on a cambered surface.

What is claimed is:

1. A braking force trailer apparatus for measuring the effectiveness of braking between a test wheel and the surface on which the wheel is running, the apparatus comprising a body portion, means mounting the test wheel to said body portion, means mounted to said body portion for attaching the apparatus to a vehicle to be towed thereby, a brake mounted to said test wheel and operable to brake same, and means responsive to the force between the running surface and the test wheel to provide a signal indicative of such force, said test wheel mounting means comprising an arm on which said test wheel is rotatably mounted, said arm being pivotally mounted to said body to allow the arm to swing relative thereto in a direction opposite to that of the motion of said body portion, when said brake is applied and said force responsive means comprising a load cell supported between said arm and said body portion, sad load cell alone restraining said arm against substantial displacement relative to said body portion due to the reaction between said test wheel and the running surface, and said load cell providing a signal indicative of the force generated thereat in restraining displacement of said arm.

2. Apparatus as claimed in claim 1, wherein said load cell is a strain gauge adapted to provide said force-indicative sgnal in electrical form.

3. Apparatus as claimed in claim 1, wherein said load cell is an hydraulic pressure capsule and further comprising a capillary tube having one end connected to the cylinder of said capsule to transmit pressure therefrom and a pressure recording device connected to the other end of said capillary tube.

4. Apparatus as claimed in claim 1, wherein said body portion comprises a box-like frame structure and a horizontal bar carried thereby and said arm is pivotally mounted on said bar.

5. Apparatus as claimed in claim 4, wherein said arm has a rigid plate-like portion above said test wheel extending along said bar.

6. Apparatus as claimed in claim 4, comprising means for carrying weights to load the test wheel, said means being pivotally mounted to said box-like structure and resilient means coupling said weight-carrying means to said box-like structure.

7. Apparatus as claimed in claim 2, further comprising a chart recorder coupled to said strain gauge to receive the electrical signal therefrom.

8. Apparatus as claimed in claim 1, further comprising a braking arrangement mounted on said trailer and connectable to a tow vehicle to act as an anti-jack-knifing brake between the trailer and the tow vehicle.

9. Apparatus as claimed in claim 1, further comprising means coupled to said load cell to automatically record the force-indicative signal produced thereby.

References Cited

UNITED STATES PATENTS

| | | | |
|---|---|---|---|
| 2,624,251 | 1/1953 | Porter | 73—84X |
| 3,273,385 | 9/1966 | Donnelly | 73—129 |
| 3,332,276 | 7/1967 | Clarke | 73—146X |
| 3,273,911 | 9/1966 | Waldie | 280—446.3 |

FOREIGN PATENTS

| | | | |
|---|---|---|---|
| 159,323 | 5/1964 | U.S.S.R. | 73—146 |
| 140,597 | 3/1961 | U.S.S.R. | 73—9 |

RICHARD C. QUEISSER, Primary Examiner

C. E. SNEE III, Assistant Examiner

U.S. Cl. X.R.

73—146